US012001868B2

(12) United States Patent  
Ito

(10) Patent No.: US 12,001,868 B2  
(45) Date of Patent: Jun. 4, 2024

(54) VM MIGRATION SYSTEM AND VM MIGRATION METHOD

(71) Applicant: Nippon Telegraph and Telephone Corporation, Tokyo (JP)

(72) Inventor: Yoshito Ito, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 853 days.

(21) Appl. No.: 17/057,339

(22) PCT Filed: May 15, 2019

(86) PCT No.: PCT/JP2019/019279  
§ 371 (c)(1),  
(2) Date: Nov. 20, 2020

(87) PCT Pub. No.: WO2019/225429  
PCT Pub. Date: Nov. 28, 2019

(65) Prior Publication Data  
US 2021/0216350 A1 Jul. 15, 2021

(30) Foreign Application Priority Data  
May 24, 2018 (JP) .................... 2018-099347

(51) Int. Cl.  
*G06F 9/455* (2018.01)  
*G06F 9/50* (2006.01)

(52) U.S. Cl.  
CPC ........ *G06F 9/45558* (2013.01); *G06F 9/5038* (2013.01); *G06F 2009/4557* (2013.01)

(58) Field of Classification Search  
CPC .............. G06F 9/45558; G06F 9/5038; G06F 2009/4557  
See application file for complete search history.

(56) References Cited

U.S. PATENT DOCUMENTS

2014/0196030 A1* 7/2014 Deshpande ......... G06F 11/3442  
718/1  
2014/0307554 A1* 10/2014 Basso .................. H04L 49/351  
370/235

(Continued)

OTHER PUBLICATIONS

Calheiros et al., "CloudSim: a toolkit for modeling and simulation of cloud computing environments and evaluation of resource provisioning algorithms", Softw. Pract. Exper. 2011: 41:23-50, Aug. 24, 2010 (Year: 2010).*

(Continued)

*Primary Examiner* — Lewis A Bullock, Jr.  
*Assistant Examiner* — Kevin X Lu  
(74) *Attorney, Agent, or Firm* — Fish & Richardson P.C.

(57) ABSTRACT

In a VM migration system 100, a controller 20 determines a priority group to which a VM whose performance is insufficient is desired to belong based on the amount of resource usage of each VM 1 and priority group setting information 14 acquired from a physical server 10. Upon acquiring performance guarantee failure alarm information, the controller 20 selects a VM to be migrated from VMs currently belonging to a priority group in which there are no vacancies, selects a physical server having the largest margin as another physical server to which the VM is to be migrated, and transmits migration instruction information to the physical server. The physical server migrates the selected VM to the other physical server.

6 Claims, 12 Drawing Sheets

(56) References Cited

U.S. PATENT DOCUMENTS

2016/0292000 A1* 10/2016 Bernal .................. G06F 9/4856
2018/0176289 A1* 6/2018 Watanabe ........... H04L 67/1008
2019/0286475 A1* 9/2019 Mani ................... G06F 9/45558

OTHER PUBLICATIONS

Acess.redhat.com, [online], "Chapter 4 Configuring CPU Pinning Using a NUMA Node," 2020, retrieved on Sep. 29, 2020, retrieved from URL<https://access.redhat.com/documentation/ja-jp/red_hat_openstack_platform/9/html/instances_and_images_guide/ch-cpu_pinning>, 13 pages (with English Translation).

Ito, "Prototype Implementation of VNF Performance Assurance System," NTT Network Service Systems Laboratories, Jan. 18-19, 2018, 50 pages (with English Translation).

* cited by examiner

Fig. 2

210 PRIORITY GROUP STATE INFORMATION

| GROUP ID | PRIORITY RANK | POSSIBLE NUMBER OF VMS BELONGING TO GROUP | NUMBER OF VACANCIES BELONGING TO GROUP |
|---|---|---|---|
| g0001 | 1 | 2 | 1 |
| g0002 | 2 | 4 | 0 |
| g0003 | 3 | 8 | 2 |

211　212　213　214

| VMID | AMOUNT OF RESOURCE USAGE | PERFORMANCE VALUE | CURRENT GROUP | DESIRED GROUP |
|---|---|---|---|---|
| v0001 | - | - | g0001 | - |
| v0002 | - | - | g0002 | - |
| v0003 | - | - | g0002 | - |
| v0004 | - | - | g0003 | - |
| v0005 | - | - | g0003 | - |
| ... | ... | ... | ... | ... |

220 VM STATE INFORMATION

Fig. 3

|       | g0001 | g0002 | g0003 |
|-------|-------|-------|-------|
| v0001 | 100   | 80    | 50    |
| v0002 | 80    | 50    | 30    |
| v0004 | 80    | 40    | 20    |
| v0005 | 90    | 70    | 30    |

Fig. 4

220 VM STATE INFORMATION

| VMID (221) | AMOUNT OF RESOURCE USAGE (222) | PERFORMANCE VALUE (223) | CURRENT GROUP (224) | DESIRED GROUP (225) |
|---|---|---|---|---|
| v0001 | [C:80, M:30, ...] | 100 | g0001 | g0002 |
| v0002 | [C:60, M:20, ...] | 50 | g0002 | g0001 |
| v0003 | [C:40, M:10, ...] | 80 | g0002 | g0002 |
| v0004 | [C:20, M:20, ...] | 20 | g0003 | g0001 |
| v0005 | [C:20, M:30, ...] | 30 | g0003 | g0002 |
| ... | ... | ... | ... | ... |

Fig. 5

| PHYSICAL SERVER ID | NUMBER OF VM VACANCIES | MARGIN |
|---|---|---|
| p0001 | 3 | — |
| p0002 | 5 | — |
| p0003 | 4 | — |
| ... | ... | ... |

230 PHYSICAL SERVER STATE INFORMATION
231, 232, 233

Fig. 6

VM MIGRATION SYSTEM AND VM MIGRATION METHOD

CROSS-REFERENCE TO RELATED APPLICATIONS

This application is a National Stage application under 35 U.S.C. § 371 of International Application No. PCT/JP2019/019279, having an International Filing Date of May 15, 2019, which claims priority to Japanese Application Serial No. 2018-099347, filed on May 24, 2018. The disclosure of the prior application is considered part of the disclosure of this application, and is incorporated in its entirety into this application.

TECHNICAL FIELD

The present invention relates to a virtual machine (VM) migration system and a VM migration method for performing migration of VMs such that the performance of each VM shared on a physical machine is guaranteed using a network virtualization technology.

BACKGROUND ART

In a general virtualized environment in which a plurality of VMs run on a physical server, server resources are shared by all VMs. The method of sharing is left to a hypervisor and a scheduler of a host operating system (OS) and cannot be controlled. Even in OpenStack widely used as a virtualized environment, for example, a physical CPU (pCPU) is shared by all VMs on a physical server.

Meanwhile, a technique for fixing (pinning) a VM to a dedicated physical CPU (CPU core) has been disclosed (Non Patent Literature 1).

With this technology of the related art, it is not possible to control the degree of sharing regarding which physical CPU a plurality of ATMs on a physical server are allowed to run on. Thus, resources are shared in an uncontrollable manner and the performance guarantee of VMs cannot be achieved if particular control is not performed in a virtualized environment such as OpenStack when the performance guarantee of a service is required as a network function. In addition, efficient use of resources and use of a flexible configuration which are the original merits of virtualization cannot be achieved when using the method of allocating VMs in a fixed manner such that they occupy resources.

To address such a problem, a system capable of realizing VM performance guarantee while improving resource use efficiency (a "VM performance guarantee system 100a" illustrated in FIG. 13 which will be described later) has been proposed (see Non Patent Literature 2).

The system (VM performance guarantee system 100a) described in Non Patent Literature 2 is configured to include a physical server (compute) including a plurality of VMs and a controller. This VM performance guarantee system 100a divides physical resources into a plurality of groups and defines priority groups which can be shared by different numbers of VMs. When the controller has determined that the performance of a VM is insufficient or excessive based on the amount of resource usage of the VM, the physical server changes the priority group of the VM. This enables realization of the performance guarantee of the VM while physical resources of the physical server are effectively used.

CITATION LIST

Non Patent Literature

Non Patent Literature 1: "Red Hat OpenStack Platform Instances & Images Guide, Chapter 4, CPU Pinning Settings Using NUMA Nodes," [online], Red Hat, [retrieved May 1, 2018], Internet <URL: https://access.redhat.com/documentation/ja-jp/red_hat_openstack_platform/9/html/instances_and_images_guide/ch-cpu_pinning>

Non Patent Literature 2: Yoshito Ito, "Prototype Implementation of VNF Performance Guarantee System," [online], Lecture Draft Posted on Jan. 12, 2018 on Website of 15th Steering Committee on Network Software of the Institute of Electronics, Information and Communication Engineers, Internet <http://www.ieice.org/cs/ns/nws/20180118_nwspaper.zip> (Application for exception of loss of novelty in Japanese Patent Application No. 2018-044010)

SUMMARY OF THE INVENTION

Technical Problem

According to the technology described in Non Patent Literature 2, it is possible to realize the performance guarantee of the VM while improving the resource use efficiency. However, there is room for further improvement in the following points.

The VM performance guarantee system 100a described in Non Patent Literature 2 changes a group to which a VM belongs among priority groups in which different numbers of VMs share resources to improve resource use efficiency or to realize performance guarantee of the VM. Here, there needs to be a vacancy in a priority group to which the group of the VM is to be changed. On the other hand, there may be a case where there are not enough vacancies to enable such change of a VM because VIM are arranged on a physical server such that vacancies in priority groups are minimized for efficient use of resources.

The VM performance guarantee system 100a transmits alarm information to a management device or the like of the system in such a case where a priority group to which a VM belongs is about to be changed to realize performance guarantee of the VM but cannot be changed. However, for actual operation, it is desirable that the system be able to autonomously perform control such that performance guarantee of each VM is realized in order to shorten the period of time during which performance guarantee cannot be realized as much as possible and to reduce the processing load of an operator who operates the management device or the like.

The present invention has been made in view of the above points and it is an object of the present invention to provide a VM migration system and a VM migration method that perform VM migration such that performance guarantee of each VM can be continuously realized even when there is no vacancy in a (candidate) priority group to which the VM is desired to belong.

Means for Solving the Problem

To solve the above problems, the invention according to claim 1 provides a VM migration system including a plurality of physical servers, each being configured to cause a plurality of virtual machines (VMs) to run, and a controller connected to the physical servers and configured to manage running states of the VMs, wherein each of the physical servers includes: a storage unit configured to store priority group setting information storing a correspondence relationship between each of a plurality of priority groups into which physical resources of the physical server are divided and VMs that are caused to run on a physical resource of the priority group, the plurality of priority groups being set such that the possible numbers of VMs belonging to the plurality of priority groups, which are the possible numbers of VMs sharing the plurality of priority groups, are different and the priority of a priority group increases as the possible number of VMs sharing the priority group decreases; a resource usage amount collector configured to collect the amount of resource usage when each VM runs and transmit the collected amount of resource usage to the controller; a priority group setting information transmitter configured to transmit the priority group setting information to the controller; a VM migrator configured to receive migration instruction information including information on a VM to be migrated and information on another physical server to which the VM is to be migrated from the controller and to migrate the VM which is to be migrated to the other physical server; and a priority group setting charger configured to, upon receiving priority group setting change information indicating an instruction to change the priority group of each of the VMs from the controller, refer to the priority group setting information and change the priority group to which the VM belongs to a new priority group, and the controller includes: a data acquirer configured to acquire the amount of resource usage of each of the VMs and the priority group setting information from the physical server; a desired group determiner configured to determine a desired priority group to which each VM is desired to belong so as not to cause insufficient performance that is performance of less than a first predetermined threshold and excessive performance that is performance of a second predetermined threshold or higher by calculating a performance value of each VM in a case where the VM belongs to each priority group using the amount of resource usage of the VM; a performance guarantee possibility determiner configured to determine whether or not performance guarantee of each VM is possible using information on a current priority group to which each VM currently belongs, indicated by the priority group setting information, and information on the determined desired priority group and to output performance guarantee failure alarm information when the performance guarantee is not possible; a VM selector configured to, upon acquiring the performance guarantee failure alarm information, refer to the priority group setting information and select the VM to be migrated from VMs currently belonging to a priority group to which the VM whose performance guarantee is not possible included in the performance guarantee failure alarm information is desired to belong and in which there are no vacancies based on a predetermined rule; and a physical server selector configured to calculate a margin for each physical server indicating how much a processing capacity of the physical server is available based on predetermined logic, select a physical server having a largest margin as the other physical server to which the VM is to be migrated, and generate and transmit the migration instruction information to the physical server including the VM whose performance guarantee is not possible.

The invention according to claim 6 provides a VM migration method for a VM migration system including a plurality of physical servers, each being configured to cause a plurality of VMs to run, and a controller connected to the physical servers and configured to manage running states of the VMs, wherein each of the physical servers includes a storage unit configured to store priority group selling information storing a correspondence relationship between each of a plurality of priority groups into which physical resources of the physical server are divided and VMs that are caused to run on a physical resource of the priority group, the plurality of priority groups being set such that the possible numbers of ATMs belonging to the plurality of priority groups, which are the possible numbers of VMs sharing the plurality of priority groups, are different and the priority of a priority group increases as the possible number of VMs sharing the priority group decreases, the VM migration method including: at the physical server, collecting the amount of resource usage when each VM runs and transmitting the collected amount of resource usage to the controller; and transmitting the priority group setting information to the controller; at the controller, acquiring the amount of resource usage of each of the VMs and the priority group setting information from the physical server; determining a desired priority group to which each VM is desired to belong so as not to cause insufficient performance that is performance of less than a first predetermined threshold and excessive performance that is performance of a second predetermined threshold or higher by calculating a performance value of each VM in a case where the VM belongs to each priority group using the amount of resource usage of the VM; determining whether or not performance guarantee of each VM is possible using information on a current priority group to which each VM currently belongs, indicated by the priority group setting information, and information on the determined desired priority group and outputting performance guarantee failure alarm information when the performance guarantee is not possible; upon acquiring the performance guarantee failure alarm information, referring to the priority group setting information and selecting the VM to be migrated from VMs currently belonging to a priority group to which the VM whose performance guarantee is not possible included in the performance guarantee failure alarm information is desired to belong and in which there are no vacancies based on a predetermined rule; and calculating a margin for each physical server indicating how much a processing capacity of the physical server is available based on predetermined logic, selecting a physical server having a largest margin as another physical server to which the VM is to be migrated, and generating and transmitting migration instruction information including information on the VM to be migrated and information on the other physical server to which the VM is to be migrated to the physical server including the VM whose performance guarantee is not possible; and at the physical server, receiving the migration instruction information from the controller and migrating the VM which is to be migrated to the other physical server; and receiving priority group setting change information indicating an instruction to change the priority group of each of the VMs from the controller, referring to the priority group setting information, and changing the priority group to which the VM belongs to a new priority group.

The controller in the VM migration system determines a (candidate) priority group to which a VM whose performance is insufficient is desired to belong and in which performance guarantee of the VM can be realized based on the amount of resource usage of each VM and priority group setting information acquired from the physical server as described above. Then, when there is no vacancy in the desired priority group and thus the priority group of the VM cannot be changed thereto, the VM migration system selects a VM to be migrated from VMs currently belonging to the priority group in which there are no vacancies, selects a physical server which maximizes the margin indicating how much of the processing capacity of the physical server is available as another physical server to which the VM is to be migrated, and transmits the selection information to the physical server as migration instruction information. The physical server migrates the selected VM to the other physical server, thereby allowing change of the priority group of the VM.

Thus, according to the VM migration system, even when there is no vacancy in a priority group to which a VM is desired to belong, performance guarantee of the VM can be continuously realized by migrating a VM.

The invention of claim 2 provides the VM migration system according to claim 1, wherein the predetermined logic for calculating the margin is Equation 1:

$$\text{Margin } M = S_k \quad \text{(Equation 1),}$$

where $S_k$ indicates the number of VM vacancies in each physical server k, and the physical server selector is configured to refer to the priority group setting information and obtain the number of VM vacancies by summing for all priority groups set in the physical server the number of vacancies belonging to a priority group obtained by subtracting the number of VMs currently belonging to the priority group from the possible number of VMs belonging to the priority group.

This allows the controller to easily determine a physical server to which to migrate a VM, assuming that the margin for each physical server increases as the number of VM vacancies in the physical server increases.

The invention of claim 3 provides the VM migration system according to claim 1, wherein the predetermined logic for calculating the margin is Equation 2:

$$\text{Margin } M = \Sigma_i a_i E_i / P_i \quad \text{(Equation 2),}$$

where $E_i$ indicates the number of vacancies belonging to a priority group i, $P_i$ indicates a priority rank of the priority group i when priority ranks of the priority groups are arranged in ascending order from a highest priority, and $a_i$ indicates a constant (a weight of the priority group i), and the physical server selector is configured to refer to the priority group setting information and calculate the number of vacancies belonging to each priority group by subtracting the number of VMs currently belonging to the priority group from the possible number of VMs belonging to the priority group.

This allows the controller to easily determine a physical server to which to migrate a VM using the number of vacancies belonging to each priority group and the priority rank of each priority group, assuming that the margin for the physical server increases as the number of vacancies belonging to priority groups with higher priority ranks increases.

The invention of claim 4 provides the VM migration system according to claim 1, wherein the predetermined logic for calculating the margin is Equation 3:

$$\text{Margin } M = \Sigma_j a_j (N_j - C_j) \quad \text{(Equation 3),}$$

where $N_j$ indicates a priority rank of a priority group to which a VMj is desired to belong when priority ranks of the priority groups are arranged in ascending order from a highest priority, $C_j$ indicates a priority rank of a priority group to which the VMj currently belongs, and $a_i$ indicates a constant (a weight of the VMj).

This allows the controller to easily determine a physical server to which to migrate a VM using the priority rank of a priority group to which each VM is desired to belong and the priority rank of a priority group to Which each VM currently belongs, assuming that the margin for the physical server increases as the number of VMs that are to shift to priority groups with lower priorities increases.

The invention of claim 5 provides the VM migration system according to any one of claims 1 to 4, wherein the controller does not include the performance guarantee possibility determiner, and the physical server instead includes a performance guarantee determiner configured to transmit the performance guarantee failure alarm information to the controller upon receiving the priority group setting change information from the controller if there is no vacancy belonging to a priority group to which a change has been instructed and thus the change is not possible.

Thus, even if the controller does not have a function of determining whether or not performance guarantee is possible (a performance guarantee possibility determiner), a physical server can transmit performance guarantee failure alarm information to the controller when a priority group of a VM in the physical server cannot be actually changed. This allows continuous realization of performance guarantee of the VM by reliably migrating a VM.

Effects of the Invention

The present invention can provide a VM migration system and a VM migration method that perform VM migration such that performance guarantee of each VM can be continuously realized even when there is no vacancy in a (candidate) priority group to which the VM is desired to belong.

BRIEF DESCRIPTION OF DRAWINGS

FIG. 2 is a diagram illustrating an exemplary data configuration of priority group state information according to the present embodiment.

FIG. 3 is a diagram illustrating an exemplary (default) data configuration of VM state information according to the present embodiment.

FIG. 4 is a diagram illustrating results of a demotion group search and a promotion group search performed by a desired group determiner according to the present embodiment.

FIG. 5 is a diagram illustrating an exemplary data configuration of VM state information according to the present embodiment.

FIG. 6 is a diagram illustrating an exemplary data configuration of physical server state information according to the present embodiment.

DESCRIPTION OF EMBODIMENTS

A system (a VM performance guarantee system 100a) on which the present invention is based will be described as a comparative example before describing a mode for carrying out the present invention (hereinafter referred to as "the present embodiment").

Comparative Example

Figure 13:
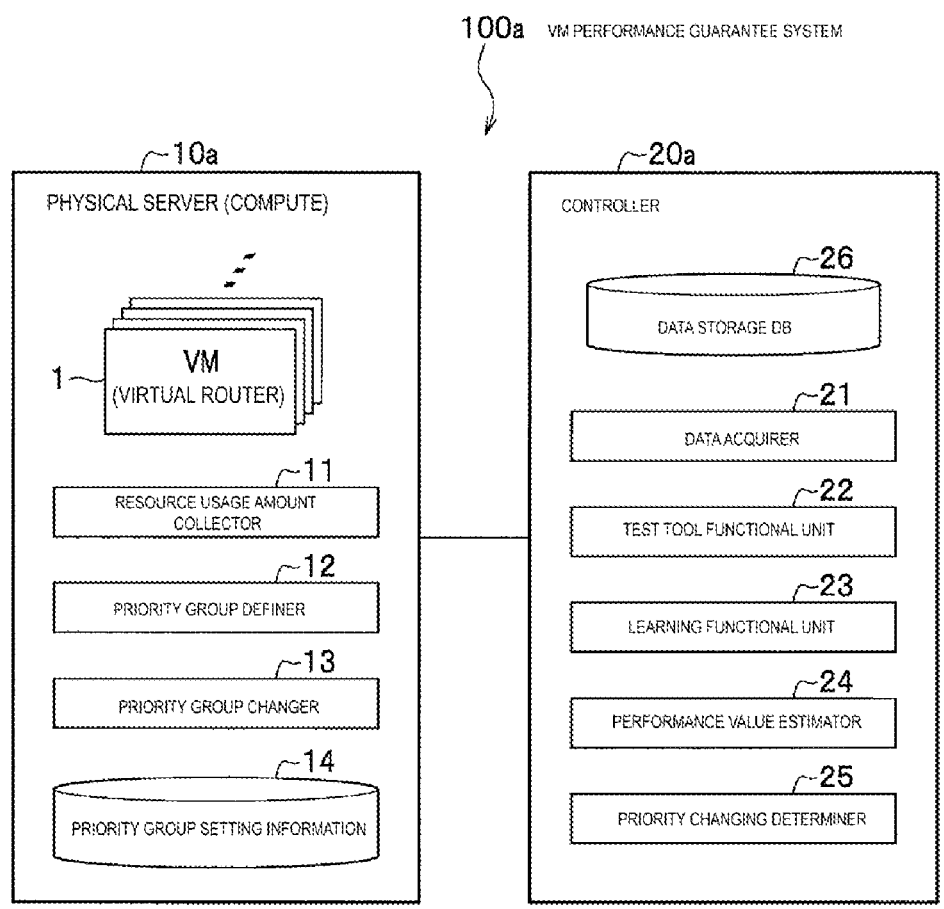
FIG. 13 is a functional block diagram of a physical server and a controller that constitute a VM performance guarantee system.

FIG. 13 illustrates a VM performance guarantee system 100a which is a comparative example of the present invention. The VM performance guarantee system 100a is configured to include a physical server 10a (compute) including a plurality of VMs 1 and a controller 20a. The VM performance guarantee system 100a has the following technical features in order to realize the performance guarantee of VMs 1 while improving the use efficiency of the physical server 10a.

Figure 8:
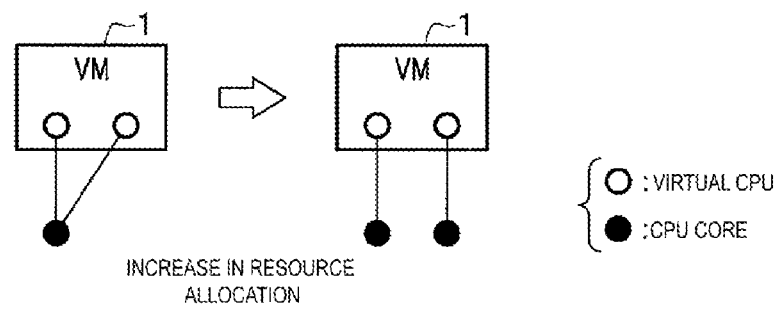
FIG. 8 is a diagram for explaining a method of the related art for increasing the allocation of resources when the load of a VM has increased.

For example, in a situation where one VM 1 (illustrated in FIG. 8 with two virtual CPUs (denoted by a in FIG. 8) provided for each VM 1) is running on one physical resource element (one CPU core: denoted by in FIG. 8), the related art prevents performance of the VM 1 from degrading when the load of the VM 1 has increased by increasing the allocation of physical resources to the VM 1, that is, by adding a CPU core to change the amount of resources allocated to the VM 1 as illustrated in FIG. 8. Specifically, when the load of the VM 1 in the left part of FIG. 8 has increased, for example, control of increasing the number of CPU cores and allocating one physical resource element (one CPU core) to each virtual CPU is performed as illustrated in the right part of FIG. 8.

Figure 9:
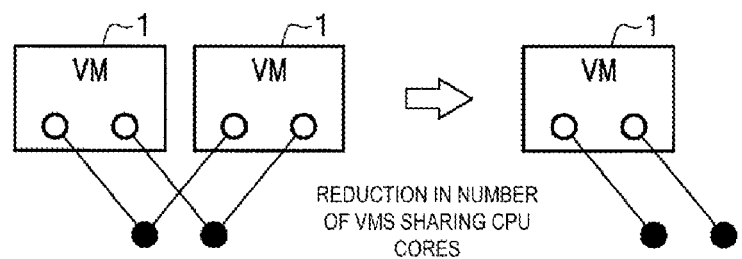
FIG. 9 is a diagram for explaining a process of changing the number of VMs sharing resources when the load of a VM has increased.

On the other hand, in a situation where two VMs 1 share two physical resource elements (CPU cores) as illustrated in FIG. 9, the VM performance guarantee system 100a prevents performance of a VM 1 from degrading when the load of the VM 1 has increased by changing the number of VMs allocated to the physical resources. In FIG. 9, control of changing the number of VMs 1 that share the physical resources from "2" to "1" is performed (see the right part of FIG. 9). That is, the number of VMs allocated to limited physical resources (CPU cores) is controlled rather than changing the amount of resources allocated to the VM 1.

Figure 10:
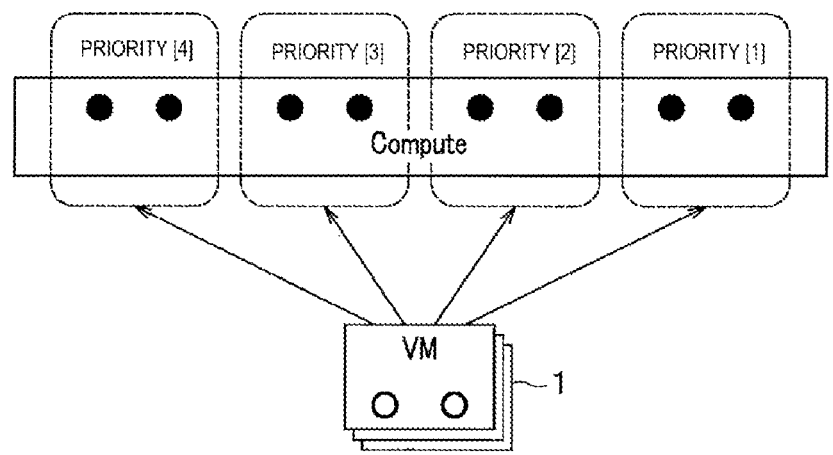
FIG. 10 is a diagram for explaining how a physical server divides resources into groups having different priorities.

In the physical server 10a of the VM performance guarantee system 100a, limited physical resources (CPU cores) are divided into groups of different priorities (see FIG. 10). Then, based on a performance estimation value (performance value) of each VM 1 calculated from the amount of resource usage of the VM 1, the group to which a VM 1 with insufficient performance belongs is changed such that the VM 1 belongs to a higher priority group. The group to which a VM 1 with excessive performance belongs is changed such that the VM 1 belongs to a lower priority group. In this manner, the VM performance guarantee system 100a determines which priority group each VM 1 is to belong to based on a performance estimation value calculated for the VM 1 and changes the priority group to which the VM 1 belongs.

The priority groups are defined as groups (with different numbers of VMs) in which different numbers of VMs 1 share physical resources. Specifically, physical resources are divided into groups of CPU pinning patterns having different overcommit rates. Then, a priority group (CPU pinning pattern) accommodating a VM 1 is dynamically changed according to the load of the VM 1. A high load occupies (is fixed to) CPUs in a (high priority) pattern having a small overcommit rate and a low load occupies CPUs in a (low priority) pattern having a great overcommit rate. This improves the use efficiency of physical resources while guaranteeing the performance of a predetermined value or higher.

Figure 11:
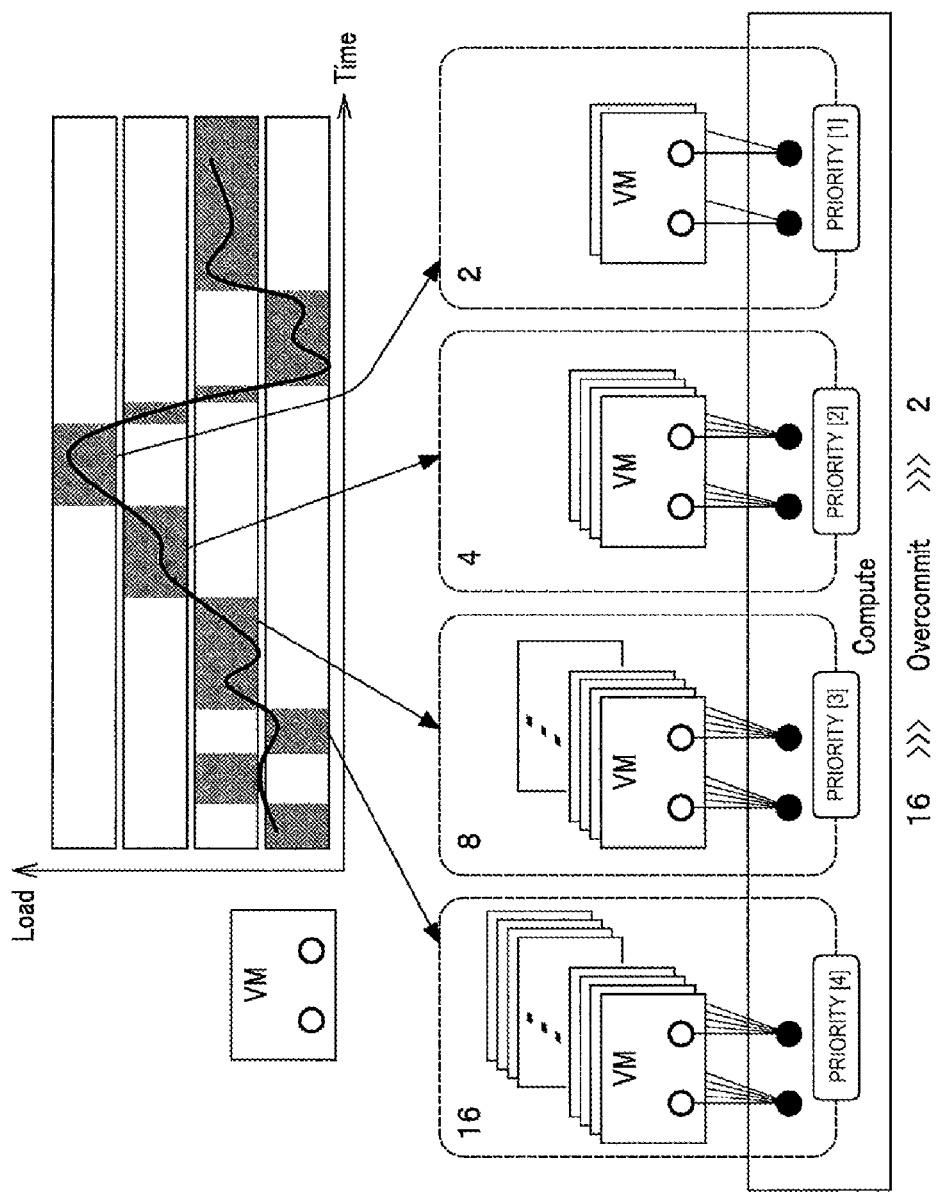
FIG. 11 is a diagram for explaining a process of changing priority groups.

For example, a "group of priority [1]" is set as a highest priority group as illustrated in FIG. 11. This "group of priority [1]" has a pattern with a small overcommit rate (high priority) which has a setting that "2" VMs are allowed to share one division (here, two CPU cores) of the limited physical resources, that is, up to 2 VMs 1 can share the division of limited physical resources. The next "group of priority [2]" is a group in which up to "4" VMs can share another division (two CPU cores) of the limited physical resources. The next "group of priority [3]" is a group in which up to "8" VMs can share another division (two CPU cores) of the limited physical resources. The "group of priority [4]" has a pattern with a great overcommit rate (low priority) which has a selling that up to "16" VMs can share another division (two CPU cores) of the limited physical resources.

Figure 12:
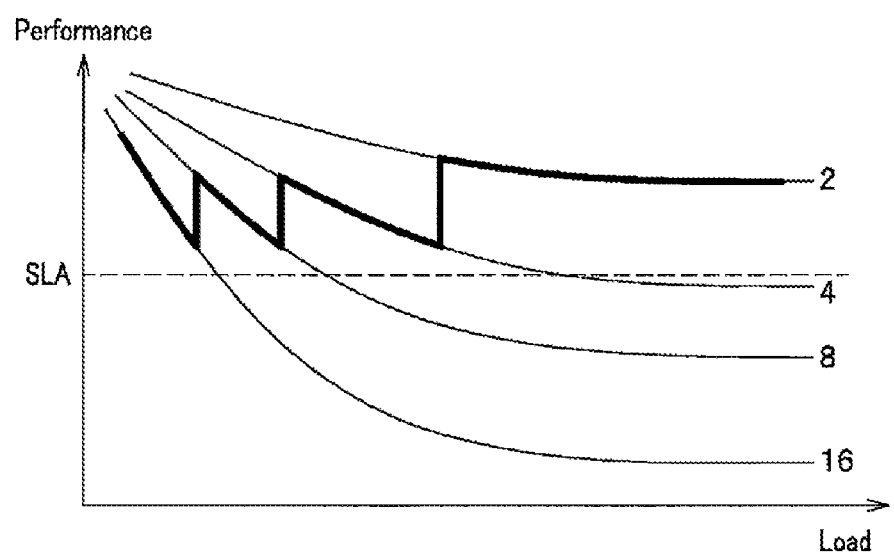
FIG. 12 is a diagram for explaining how performance guarantee of a VM is realized by changing its priority group.

In the VM performance guarantee system 100a, for example, as illustrated in FIG. 12, when the performance of a VM 1 that initially belongs to the "group of priority [4]" with the number of VMs of "16" has degraded and approached a performance value indicated by a service level agreement (SLA), which has been made in advance with a user, by a predetermined value or higher (when the performance has become insufficient), the group to which the VM 1 belongs is changed to a "group of priority [3]" with a higher priority and a smaller overcommit rate (in which the number of VMs that can share the group is "8"). Thereafter, when the performance of the VM 1 has further degraded and approached the performance value indicated by the SLA by a predetermined value or higher, similarly, the group to which the VM 1 belongs is changed to a group with a higher priority and a smaller overcommit rate such as "a group of priority [2]" (in which the number of VMs that can share the group is "4") or "a group of priority [1]" (in which the number of VMs that can share the group is "2"). This realizes the performance guarantee of the VM 1.

Also, in the VM performance guarantee system 100a, when the performance is more than sufficient (when the performance is excessive), the group to which the VM 1 belongs is changed to a group with a lower priority and a greater overcommit rate. This can improve the use efficiency of the physical resources (CPU cores).

Configuration of VM Performance Guarantee System as Comparative Example

Next, the configuration of the VM performance guarantee system 100a, which is a comparative example of the present invention, will be described.

FIG. 13 is a functional block diagram of the physical server 10a and the controller 20a that constitute the VM performance guarantee system 100a. The physical server 10a and the controller 20a are connected via a communication network. In the following description, it is assumed that a plurality of VMs 1 functioning as virtual routers are arranged on one physical server 10a.

Physical Server 10a

The physical server 10a has a function of setting a plurality of VMs 1 (virtual machines) on the physical server (a compute function). Each VM 1 is required to satisfy performances defined by an SLA or the like (for example, a packet transfer delay (latency) and a throughput). The physical server 10a divides physical resources (for example, CPU cores) included in the physical server 10a into a plurality of groups having different priorities and defines priority groups (with different numbers of ATMs) in which different numbers of VMs 1 share the respective divisions of the physical resources. Then, the physical server 10a changes the priority group of a VM 1 to another priority group having a different overcommit rate according to the load of the VM 1.

The physical server 10a has a function of generating VMs 1 (not illustrated) and also includes a resource usage amount collector 11, a priority group definer 12, a priority group changer 13, and priority group setting information 14.

The resource usage amount collector 11 collects the amount of resource usage of each VM 1 (such as the amount of CPU usage, the amount of memory usage, and the number of transmitted/received packets). Then, the resource usage amount collector 11 transmits the collected information on the amount of resource usage of each VM 1 to the controller 20a. When a test tool which will be described later has been executed in accordance with an instruction from the controller 20a, the resource usage amount collector 11 transmits the amount of resource usage of each VM 1, which is a test result of the test tool, to the controller 20a.

The priority group definer 12 divides CPU cores, which are physical resources of the physical server 10a, into a plurality of groups. Then, the priority group definer 12 sets priority groups by dividing the plurality of groups into CPU pinning patterns having different overcommit rates.

Specifically, the priority group definer 12 sets, for example, a "group of priority [1]" shared by "2" VMs as a group having the highest priority as illustrated in FIG. 11. The priority group definer 12 sets a "group of priority [2]" shared by "4" VMs as a group having the next highest priority. The priority group definer 12 further sets a "group of priority [3]" shared by "8" VMs as a group having the next highest priority. The priority group definer 12 further sets a "group of priority [4]" shared by "16" VMs as a group having the next highest priority (the lowest priority). Here, the technique of fixing (pinning) the VM 1 to dedicated CPU cores is realized, for example, by the technology of Non Patent Literature 1.

The priority group definer 12 stores priority group setting information 14. The priority group setting information 14 includes information on physical resources (CPU cores) corresponding to each priority group, the number of VMs sharing the physical resources (CPU cores) of each priority group (the overcommit rate), and information indicating which priority group (which of the groups of priorities [1] to [4]) each VM 1 belongs to.

The priority group changer 13 receives priority group change information indicating an instruction to change the priority group of a VM 1 from the controller 20a, refers to the priority group setting information 14 to identify the priority group to which the VM 1 belongs, and changes the priority group to a priority group of a CPU pinning pattern having a smaller (or greater) overcommit rate.

Controller 20a

The controller 20a acquires information on the amount of resource usage of each VM 1 from the physical server 10a and calculates a performance estimation value (performance value) of the VM 1 (virtual router). Then, the controller 20a determines which of an insufficient performance range, an unnecessary change range, and an excessive performance range the calculated performance estimation value of the VM 1 belongs to. Upon determining that the performance estimation value of the VM 1 belongs to the insufficient performance range, the controller 20a transmits an instruction (priority group change information) to change to a priority group of a CPU pinning pattern having a smaller overcommit rate to the physical server 10a. Further, upon determining that the performance estimation value of the VM 1 belongs to the excessive performance range, the controller 20a transmits an instruction (priority group change information) to change to a priority group of a CPU pinning pattern having a greater overcommit rate to the physical server 10a.

The controller 20a includes a data acquirer 21, a test tool functional unit 22, a learning functional unit 23, a performance value estimator 24, a priority change determiner 25, and a data storage DB 26.

The data acquirer 21 acquires the amount of resource usage of each VM 1 collected by the physical server 10a and stores it in the data storage DB 26. Further, the data acquirer 21 acquires test result information such as the amount of resource usage collected as a result of the test tool executed by the physical server 10a and stores it in the data storage DB 26.

The test tool functional unit 22 activates the test tool and transmits a data acquisition start instruction to the physical server 10a to acquire data of the amount of resource usage of each VM 1 and data of a performance value (for example, a delay) corresponding thereto from the physical server 10a.

For example, for each VM 1 belonging to the priority groups set with different overcommit rates, the test tool functional unit 22 causes the load of the VM 1 to change in a predetermined pattern and acquires the amount of resource usage obtained accordingly and a performance value at that time as test result information.

The learning functional unit 23 performs analysis by machine learning (for example, regression analysis learning) using the test tool result data (test result information) acquired by the test tool functional unit 22 and generates learning result data. The learning result data is information for estimating a performance value from the amount of resource usage for each VM 1 belonging to each overcommit rate (priority group).

The performance value estimator 24 calculates a performance estimation value (performance value) of each VM 1 using learning result data held in the learning functional unit 23 based on the amount of resource usage of each VM 1 (at the current time) acquired from the physical server 10a.

Using the performance estimation value of each VM 1 calculated by the performance value estimator 24, the priority change determiner 25 determines which of the insufficient performance range, the unnecessary change range, and the excessive performance range the calculated performance estimation value of the VM 1 belongs to.

For example, upon determining that the performance estimation value of the VM 1 belongs to the insufficient performance range, the priority change determiner 25 transmits an instruction (priority group change information) to change to a priority group of a CPU pinning pattern having a smaller overcommit rate to the physical server 10a, Upon determining that the performance estimation value of the VM 1 belongs to the excessive performance range, the priority change determiner 25 transmits an instruction (priority group change information) to change to a priority group of a CPU pinning pattern having a greater overcommit rate to the physical server 10a. Upon determining that the performance estimation value of the VM 1 belongs to the unnecessary change range, the priority change determiner 25 does not transmit a priority group change instruction to the physical server 10a. This maintains belonging of the VM 1 to the priority group at that time.

By changing the priority group when the performance of the VM 1 is insufficient or excessive as described above, the VM performance guarantee system 100a of the comparative example can realize the performance guarantee of the VM 1 while physical resources are efficiently used.

Present Embodiment

Next, a VM migration system 100 according to the present embodiment will be described. In the VM performance guarantee system 100a (see FIG. 13) of the comparative example described above, when the performance of a VM 1 is insufficient and the physical server 10a has received priority group change information from the controller 20a, the priority group changer 13 in the physical server 10a cannot change the priority group of the VM 1 if there is no vacancy in a priority group to which the priority group of the VM 1 is to be changed. In this case, the physical server 10a transmits alarm information to the controller 20a, a management device (not illustrated) of the VM performance guarantee system 100a, and the like.

On the other hand, in the VM migration system 100 according to the present embodiment, the controller 20 calculates a performance value of each VM 1 based on the amount of resource usage of each VM 1 acquired from the physical server 10 and determines, for each VM 1 whose performance is insufficient, a (candidate) priority group to which the VM 1 is desired to belong such that performance guarantee can be realized. When there is no vacancy in a priority group to which a VM 1 is desired to belong and thus the priority group of the VM 1 cannot be changed thereto, the VM migration system 100 selects another VM 1 from the physical server 10 and migrates the selected VM 1 to another physical server 10. This allows the priority group of a VM 1 whose performance is insufficient to be changed to a priority group to which the VM 1 is desired to belong, such that performance guarantee of each VM 1 can be continuously realized.

Figure 1:
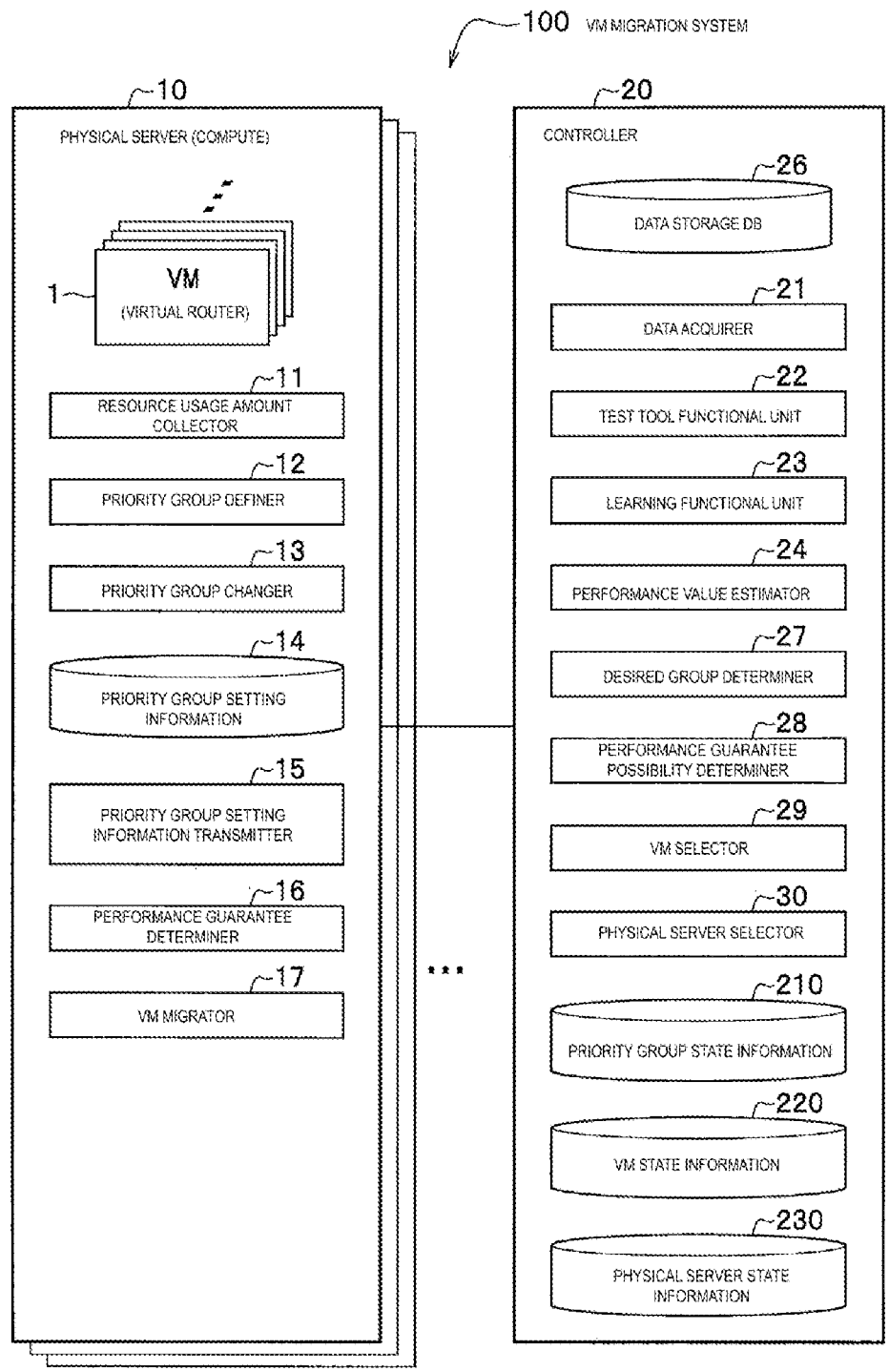
FIG. 1 is a functional block diagram of a plurality of physical servers and a controller that constitute a VM migration system according to the present embodiment.

FIG. 1 is a functional block diagram of a plurality of physical servers 10 and a controller 20 that constitute the VM migration system 100 according to the present embodiment. The physical servers 10 and the controller 20 are connected via a communication network. The physical servers 10 are also connected to each other via the communication network. The present embodiment will be described assuming that a plurality of VMs 1 functioning as, for example, virtual routers are arranged on each physical server 10. One physical server 10 will be described as a representative because each physical server 10 has the same configuration.

Physical Server 10

The physical server 10 has a function of setting a plurality of VMs 1 (virtual machines) on the physical server (a compute function). Performances defined by an SLA or the like for each VM 1 include, for example, a packet transfer delay (latency) of the VM 1 (virtual router) and a throughput. The amount of CPU usage of the VM 1 (virtual router), the amount of memory usage, the number of transmitted/received packets, and the like are used as the amount of resource usage.

The physical server 10 divides physical resources (for example, CPU cores) included in the physical server 10 into a plurality of groups having different priorities and defines priority groups with divisions of the physical resources which are shared by different numbers of VMs 1 (to which different numbers of VMs 1 can belong). Then, the physical server 10 transmits the amount of resource usage of each VM and priority group setting information 14 including which group each VM 1 currently belongs to the controller 20 at predetermined time intervals. The physical server 10 receives priority group setting change information indicating a new priority group to which the VM 1 is to belong determined by the controller 20 and changes the priority group of the VM 1.

Further, when the priority group of a VM 1 is about to be changed to a new priority group to which the VM 1 is to belong as indicated by priority group setting change information, the physical server 10 transmits alarm information (performance guarantee failure alarm information) to the controller 20 if there is no vacancy in the new priority group to which the VM 1 is to belong and thus the change is not possible. Then, the physical server 10 migrates a VM 1 selected by the controller 20 to a physical server 10 having the largest margin for performance guarantee. This reliably changes the priority group of a VM 1 whose performance is insufficient to a priority group (a new priority group to which the VM 1 is to belong) in which performance guarantee can be realized, thereby realizing performance guarantee of each VM 1.

The physical server 10 has a function of generating VMs 1 (not illustrated) and also includes a resource usage amount collector 11, a priority group definer 12, a priority group changer 13, priority group setting information 14, a priority group setting information transmitter 15, a performance guarantee determiner 16, and a VM migrator 17. The physical server 10 also includes an input/output unit and a storage unit (both not illustrated).

The input/output unit includes a communication interface for transmitting or receiving information and an input/output interface for transmitting or receiving information to or from input devices such as touch panels and keyboards and output devices such as monitors. The storage unit includes a flash memory, a hard disk, a random access memory (RAM), or the like. The priority group setting information 14 illustrated in FIG. 1 is stored in the storage unit of the physical server 10.

The configuration of the physical server 10 according to the present embodiment differs from the configuration of the physical server 10a of the VM performance guarantee system 100a of the comparative example illustrated in FIG. 13 in that the physical server 10 according to the present embodiment includes the priority group setting information transmitter 15, the performance guarantee determiner 16, and the VM migrator 17. Components having the same functions as those of the physical server 10a of the comparative example are given the same terms and reference signs and detailed descriptions thereof will be omitted.

The priority group setting information transmitter 15 transmits the priority group setting information 14 in the storage unit to the controller 20, for example, at predetermined time intervals or triggered by the resource usage amount collector 11 collecting the amount of resource usage of each VM 1 or upon receiving an acquisition request from the controller 20. Specifically, the priority group setting information transmitter 15 transmits the number of VMs that share physical resources (CPU cores) of each priority group (the possible number of VMs belonging to each priority group: overcommit rate) and information indicating which priority group (for example, which of the groups of priorities [1] to [3]) each VM 1 belongs to, both of which are indicated by the priority group setting information 14, to the controller 20.

In the following description, it is assumed that the priority group definer 12 of the physical server 10 according to the present embodiment sets three groups (of priorities (priority ranks) [1] to [3]) as priority groups accommodating VMs 1. The groups are given priority ranks in ascending order from the group having the highest priority. Among these, the group having the highest priority (priority rank) is the priority group [1] and the number of VMs that can share the group (the possible number of VMs belonging to the group) is "2." The group having the next highest priority (priority rank) is the priority group "2" and the number of VMs that can share the group (the possible number of VMs belonging to the group) is "4." The group having the next highest priority (priority rank) (lowest priority) is the priority group "3" and the number of VMs that can share the group (the possible number of VMs belonging to the group) is "8."

Upon receiving priority group setting change information from the controller 20, the performance guarantee determiner 16 determines whether or not a change of a priority group to which a VM 1 currently belongs to a new priority group to which the VM 1 is to belong included in the priority group setting change information is possible by referring to the priority group setting information 14.

Then, when there is no vacancy in a priority group to which a change is to be made and thus the change is not possible, the performance guarantee determiner 16 transmits performance guarantee failure alarm information to the controller 20. Further, when there is a vacancy in a priority group to which a change is to be made and thus the change is possible, the performance guarantee determiner 16 outputs information indicating this fact to the priority group changer 13 to cause the priority group changer 13 to change the priority group.

The VM migrator 17 receives migration instruction information including information on a VM 1 selected as a VM 1 to be migrated and information on a physical server 10 selected as a physical server 10 to which to migrate the VM 1 from the controller 20. Then, the VM migrator 17 migrates the selected VM 1 in cooperation with a VM migrator 17 of the selected physical server 10. The VM migrator 17 updates the priority group setting information 14 based on information on the migrated VM 1.

Controller 20

The controller 20 acquires the amount of resource usage and the priority group setting information 14 from a physical server 10. Then, the controller 20 determines a (candidate) priority group to which each VM 1 is desired to belong. The controller 20 transmits the determined priority group to which each VM 1 is desired to belong to the physical server 10, When the controller 20 has received performance guarantee failure alarm information from a physical server 10 or when the controller 20 itself has determined that performance guarantee of a VM 1 is not possible based on the determined priority group to which the VM 1 is desired to belong and thus generated performance guarantee failure alarm information, the controller 20 selects a VM 1 to be migrated from VMs arranged on the physical server 10 including the VM 1 for which it has been determined that performance guarantee is not possible. The controller 20 calculates the margin for the running state regarding the performance of each physical server 10 at predetermined time intervals. Then, the controller 20 selects a physical server 10 having the largest margin as a physical server 10 to which to migrate a VM. The controller 20 transmits migration instruction information including information on the VM 1 selected as a VM 1 to be migrated and information on the physical server 10 selected as a physical server 10 to which to migrate the VM to the physical server 10 including the VM 1 indicated by the performance guarantee failure alarm information.

The controller 20 includes a data acquirer 21, a test tool functional unit 22, a learning functional unit 23, a performance value estimator 24, a data storage DB 26, a desired group determiner 27, a performance guarantee possibility determiner 28, a VM selector 29, a physical server selector 30, priority group state information 210, VM state information 220, and physical server state information 230. The controller 20 also includes an input/output unit and a storage unit (both not illustrated).

The input/output unit includes a communication interface for transmitting or receiving information and an input/output interface for transmitting or receiving information to or from input devices such as touch panels and keyboards and output devices such as monitors.

The storage unit includes a flash memory, a hard disk, a RAM, or the like. The storage unit of the controller 20 includes a data storage DB 26, priority group state information 210, VM state information 220, and physical server state information 230 as illustrated in FIG. 1. The data storage DB 26 stores information on the amount of resource usage of each VM 1 (such as the amount of CPU usage, the amount of memory usage, and the number of transmitted/received packets), the priority group setting information 14, and the like acquired from each physical server 10. The data storage DB 26 also stores information on test results for each VM 1 acquired from the physical server 10 in accordance with an instruction from the test tool functional unit 22. The priority group state information 210, the VM state information 220, and the physical server state information 230 are pieces of information provided each time the controller 20 performs processing related to changing the priority group of each VM 1 (details will be described later).

As compared with the configuration of the controller 20a of the VM performance guarantee system 100a of the comparative example illustrated in FIG. 13, the controller 20 according to the present embodiment does not include the priority change determiner 25 of the controller 20a (FIG. 13). The controller 20 differs from the controller 20a in that it instead includes the desired group determiner 27, the performance guarantee possibility determiner 28, the VM selector 29, the physical server selector 30, the priority group state information 210, the VM state information 220, and the physical server state information 230. Components having the same functions as those of the controller 20a of the comparative example are given the same names and reference signs and detailed descriptions thereof will be omitted.

For each VM 1, the desired group determiner 27 determines a new priority group to which the VM 1 is to belong (a priority group desired to belong to) so as not to cause insufficient performance or excessive performance based on the amount of resource usage and the priority group setting information 14 that the data acquirer 21 has acquired from the physical server 10. The priority group desired to belong to may also include a priority group to which the VM 1 currently belongs.

Specifically, the desired group determiner 27 determines a new priority group to which the VM 1 is to belong by generating priority group state information 210 (see FIG. 2)

and VM state information 220 (see FIG. 3) for each physical server 10 as illustrated below.

Hereinafter, a desired group determination process performed by the desired group determiner 27 will be described in detail.

First, using priority group setting information 14 acquired by the data acquirer 21, the desired group determiner 27 calculates the number of vacancies belonging to each priority group and generates priority group state information 210.

FIG. 2 is a diagram illustrating an exemplary data configuration of the priority group state information 210 according to the present embodiment.

The desired group determiner 27 generates the priority group state information 210 using the number of VMs that share physical resources (CPU cores) of each priority group (the possible number of VMs belonging to each priority group) and information indicating which priority group (which of the groups of priorities [1] to [3]) each VM 1 belongs to, both of which are included in the priority group setting information 14.

As illustrated in FIG. 2, the priority group state information 210 includes items of a group ID 211, a priority rank 212, the possible number of VMs belonging to group 213, and the number of vacancies belonging to group 214.

The group ID 211 is information for identifying each priority group. The priority rank 212 is a value that ranks the priorities ([1] to [3]) of priority groups from the highest priority. The possible number of VMs belonging to group 213 indicates the number of VMs set to be able to share physical resources (CPU cores) of each priority group. The number of vacancies belonging to group 214 is the number of vacancies belonging to the priority group obtained by subtracting the number of VMs 1 currently belonging to the priority group from the possible number of VMs belonging to group 213. The desired group determiner 27 can acquire information on a priority group to which a VM 1 currently belongs using the priority group setting information 14. In FIG. 2, the number of vacancies 214 belonging to a priority group having a group ID 211 of "g0001" is "1." The number of vacancies 214 belonging to a priority group having a group ID 211 of "g0002" is "0." Further, the number of vacancies 214 belonging to a priority group having a group ID 211 of "g0003" is "2."

Next, the desired group determiner 27 generates default VM state information 220 using information indicating which priority group (which of the groups of priorities [1] to [3]) each VM 1 belongs to included in the priority group setting information 14.

FIG. 3 is a diagram illustrating an exemplary (default) data configuration of the VM state information 220 according to the present embodiment.

As illustrated in FIG. 3, the VM state information 220 includes items of a VMID 221, the amount of resource usage 222, a performance value 223, a current group 224, a desired group 225.

The VMID 221 is information for identifying each VM 1.

The amount of resource usage 222 stores the amount of resource usage (for example, the amount of CPU usage and the amount of memory usage) of each VM 1 acquired from the physical server 10.

The performance value 223 stores the performance value that the performance value estimator 24 has calculated based on the amount of resource usage of each VM 1.

The current group 224 stores a priority group to which the VM 1 currently belongs.

The desired group 225 stores a priority group to which the VM 1 is desired to belong which the desired group determiner 27 has determined through a process which will be described later.

Next, the desired group determiner 27 performs the following processing at each time when the data acquirer 21 acquires information on the amount of resource usage from the physical server 10 (see FIG. 5 as appropriate).

First, the desired group determiner 27 incorporates the information on the amount of resource usage acquired by the data acquirer 21 into the VM state information 220. Further, the desired group determiner 27 incorporates and stores information on a performance value, which the performance value estimator 24 has calculated based on the amount of resource usage, in the VM state information 220.

In the VM state information 220 illustrated in FIG. 5, the amount of CPU usage (denoted as "C" in FIG. 5) and the amount of memory usage (denoted as "M" in FIG. 5) are stored as the amount of resource usage and a performance value 223 obtained from the value of the amount of resource usage is stored. The amount of resource usage and the performance value are illustrated as normalized values with the maximum value being 100 for ease of description.

Here, the desired group determiner 27 determines which of the "insufficient performance range," the "unnecessary change range," and the "excessive performance range" the performance value calculated based on the amount of resource usage belongs to according to predetermined performance value determination criteria. Respective conditions (criteria) for determining whether or not the performance value belongs to the "insufficient performance range," the "unnecessary change range," and the "excessive performance range" are preset. For example, insufficient performance is set as performance of less than a first predetermined threshold and excessive performance is set as performance of a second predetermined threshold or higher. Here, it is assumed that performance values in the insufficient performance range are "0 or more and less than 60," performance values in the "unnecessary change range" are "60 or more and less than 90," and performance values in the excessive performance range are "90 or more and 100 or less."

In the example illustrated in FIG. 5, a VM 1 having a VMID 221 of "v0001" is determined to belong to the excessive performance range because its performance value 223 is "100." A VM 1 having a VMID 221 of "v0002" is determined to belong to the insufficient performance range because its performance value 223 is "50." A VM 1 having a VMID 221 of "v0003" is determined to belong to the unnecessary change range because its performance value 223 is "80." A VM 1 having a VMID 221 of "v0004" is determined to belong to the insufficient performance range because its performance value 223 is "20." A VM 1 having a VMID 221 of "v0005" is determined to belong to the insufficient performance range because its performance value 223 is "30."

Here, for the VM 1 having the VMID 221 of "v0003" determined to belong to the unnecessary change range, the desired group determiner 27 sets the desired group 225 to "g0002" which is the same as the current priority group.

Subsequently, the desired group determiner 27 determines a new priority group to which the VM 1 is desired to belong for each VM 1 that falls in the insufficient performance range or the excessive performance range. Specifically, the desired group determiner 27 performs a "demotion group search" for the VM 1 determined to belong to the excessive performance range and determines that a priority group in which a calculated performance value falls in the "unnecessary change range" is a priority group to which the VM 1 is desired to belong. The desired group determiner 27 performs a "promotion group search" for the VM 1 determined to belong to the insufficient performance range and determines that a priority group in which a calculated performance value falls in the "unnecessary change range" is a priority group to which the VM 1 is desired to belong.

The demotion group search is performed by performing the following processing until a performance value calculated by the performance value estimator 24 falls in the "unnecessary change range."

The desired group determiner 27 causes the performance value estimator 24 to calculate a performance value in a priority group that is one rank lower than the group to which the VM 1 currently belongs. Then, the desired group determiner 27 determines the range of the calculated performance value and repeats the calculation of a performance value in a priority group that is one rank lower until the calculated performance value falls in the "unnecessary change range." Then, the desired group determiner 27 determines that a priority group in which the calculated performance value falls in the "unnecessary change range" is a group to which the VM 1 is desired to belong.

The promotion group search is performed by performing the following processing until a performance value calculated by the performance value estimator 24 falls in the "unnecessary change range."

The desired group determiner 27 causes the performance value estimator 24 to calculate a performance value in a priority group that is one rank higher than the group to which the VM 1 currently belongs. Then, the desired group determiner 27 determines the range of the calculated performance value and repeats the calculation of a performance value in a priority group that is one rank higher until the calculated performance value falls in the "unnecessary change range." Then, the desired group determiner 27 determines that a priority group in which the calculated performance value falls in the "unnecessary change range" is a group to which the VM 1 is desired to belong.

FIG. 4 is a diagram illustrating results of the demotion group search and the promotion group search performed by the desired group determiner 27.

A demotion group search is performed for the VM 1 whose VMID 221 is "v0001" and it is calculated that the "unnecessary change range" is reached in the priority group of "g0002." A promotion group search is performed for the VM 1 whose VMID 221 is "v0002" and it is calculated that the "unnecessary change range" is reached in the priority group of "g0001." A promotion group search is performed for the VM 1 whose VMID 221 is "v0004" and it is calculated that the "unnecessary change range" is reached in the priority group of "g0001." A promotion group search is performed for the VM 1 whose VMID 221 is "v0005" and it is calculated that the "unnecessary change range" is reached in the priority group of "g0002." The desired group determiner 27 may determine a priority group in which the unnecessary change range is reached by performing the calculation considering cases where each VM 1 is present in all priority groups, including states indicated by alternate long and short dash lines in FIG. 4.

The desired group determiner 27 stores priority groups to which the VMs 1 are desired to belong, determined by performing the above demotion group search or promotion group search, in the desired group 225 of the VM state information 220 as illustrated in FIG. 5. In this way, the desired group determiner 27 generates the priority group state information 210 (FIG. 2) and the VM state information 220 (FIG. 5) and determines a priority group to which each VM 1 is desired to belong and ends the desired group determination process.

Then, the desired group determiner 27 transmits the new priority group to which each VM 1 is desired to belong stored in the VM state information 220 to the physical server 10 as priority group setting change information.

Returning to FIG. 1, the performance guarantee possibility determiner 28 determines whether or not performance guarantee defined by the SLA or the like can be realized based on predetermined logic (performance guarantee possibility determination logic) using information on the current priority group of the VM 1 (to which the VM 1 currently belongs) and the priority group to which the VM 1 is desired to belong determined by the desired group determiner 27.

The performance guarantee possibility determiner 28 adopts, for example, the following logic as logic for determining whether or not performance guarantee can be realized.

"Σ(Priority rank of desired priority group−Priority rank of current priority group)≤0"   (condition 1), and "Number of VMs that are desired to belong to priority group with priority rank $a$≤Total possible number of VMs belonging to priority groups with priority rank $a$ or higher"   (condition 2)

Here, "a" indicates each priority group with priority rank "a" (here, "1" to "3").

In the example illustrated in FIG. 5, the conditions 1 and 2 are determined as follows. The following calculation is performed assuming that the current group 224 and the desired group 225 of each of the six VMs 1 whose VMIDs 221 are "v0006" to "v0011" not illustrated in FIG. 5 are the same priority group. Specifically, it is assumed that the number of VMs 1 whose current group ID is "g0002" is two and the number of VMs 1 whose current group ID is "g0003" is four.

The condition 1 is calculated as follows for VMs 1 whose VMIDs 221 are "v0001," "v0002," "v0004," and "v0005." When the desired group and the current group have the same priority rank, the difference is "0" and thus the calculation is not performed and description is omitted.

Σ(Priority rank of desired priority group−Priority rank of current priority group)=(2−1)+(1−2)+ (1−3)+(2−3)=−3≤0

Thus, the condition 1 is satisfied.

Regarding the condition 2, the number of VMs desiring the priority rank "1" (priority group [1]) is "2" and the total possible number of VMs belonging to the priority rank "1" or higher is "2." Thus, 2≤2 and the condition 2 is satisfied for the priority rank "1." The number of VMs desiring the priority rank "2" (priority group [2]) is "5" and the total possible number of VMs belonging to the priority rank "2" or higher is "4" (4+0). Thus, 5≤4 and the condition 2 is not satisfied for the priority rank "2." Here, "+0" is added because there is no vacancy belonging to the priority group having the priority rank "1."

The number of VMs desiring the priority rank "3" (priority group [3]) is "4" and the total possible number of VMs belonging to the priority rank "3" or higher is "8" (8+0+0). Thus, 4 8 and the condition 2 is satisfied for the priority rank "3." Here, "+0+0" is added because there is no vacancy belonging to the priority groups having the priority ranks "1" and "2."Therefore, for the prior 4 group of priority rank "2," the condition 2 is not satisfied and thus the performance guarantee possibility determiner 28 determines that performance guarantee is not possible. Upon determining that performance guarantee is not possible, the performance guarantee possibility determiner 28 outputs performance guarantee failure alarm information to the VM selector 29. The performance guarantee failure alarm information includes the priority group to which the VM 1 whose performance guarantee is not possible belongs and the identification information of the physical server 10 including the VM 1. Here, the performance guarantee failure alarm information including the identification information of the physical server 10 and information on the priority group [2] in which there are no vacancies is Output.

Returning to FIG. 1, upon acquiring the performance guarantee failure alarm information from either or both of the performance guarantee determiner 16 in the physical server 10 and the performance guarantee possibility determiner 28 of the controller 20, the VM selector 29 identifies the physical server 10 using an identifier of the physical server 10 included in the performance guarantee failure alarm information. The VM selector 29 refers to priority group setting information 14 regarding the identified physical server 10 stored in the data storage DB 26 and extracts VMs 1 currently belonging to the priority group to which the VM 1 whose performance guarantee is not possible is desired to belong and in which there are no vacancies (here, the priority group [2]). Then, the VM selector 29 selects a VM 1 to be migrated from the extracted VMs 1 according to a predetermined rule. This predetermined rule is, for example, to select a VM 1 with the smallest amount of resource usage (for example, memory usage) and is preset.

The physical server selector 30 calculates a margin for each physical server 10 indicating how much of the processing capacity of the physical server 10 is available based on predetermined logic (margin calculation logic) at predetermined time intervals, for example, at each time when the controller 20 acquires information on the amount of resource usage and the priority group setting information 14 from the physical server 10. Then, the physical server selector 30 selects a physical server 10 which has the largest margin among the margins for the physical servers 10 as a physical server 10 to which to migrate the VM.

The physical server selector 30 generates physical server state information 230 illustrated in FIG. 6 when calculating the margin.

The physical server state information 230 includes items of a physical server ID 231, the number of VM vacancies 232, and a margin 233 as illustrated in FIG. 6.

The physical server ID 231 is information for identifying each physical server 10.

The number of VM vacancies 232 is the total number of vacancies of VMs 1 belonging to each physical server 10. The number of VM vacancies 232 stores a value obtained by summing for all priority groups the number of vacancies belonging to group 214 in the priority group state information 210 illustrated in FIG. 2.

The margin 233 is calculated, for example, using one of the following three margin calculation logics.

Margin Calculation Logic "1"

The number of VM vacancies in each physical server 10 is used as a margin.

$$\text{Margin } M=S_k \quad \text{(Equation 1)}$$

Here, $S_k$ indicates the number of VM vacancies in the physical server 10.

When this margin calculation logic "1" is used, the number of VM vacancies 232 and the margin 233 of the physical server state information 230 illustrated in FIG. 6 have the same values.

Use of the margin calculation logic "1" allows the controller 20 to easily determine a physical server 10 to which to migrate a VM, assuming that the margin for each physical server 10 increases as the number of VM vacancies in the physical server 10 increases.

Margin Calculation Logic "2"

The margin is calculated using Equation 2 for priority groups i belonging to each physical server 10.

$$\text{Margin } M=\Sigma_i a_i E_i/P_i \quad \text{(Equation 2)}$$

Here, $E_i$ indicates the number of vacancies belonging to the priority group. $P_i$ indicates the priority rank of the priority group. $a_i$ indicates a constant (a weight for each priority group). The physical server selector 30 can acquire information on the number of vacancies $E_i$ belonging to the priority group and information on the priority rank $P_i$ of the priority group by referring to priority group state information 210 (FIG. 2) which is stored in association with each physical server 10.

Use of the margin calculation logic "2" allows the controller 20 to easily determine a physical server 10 to which to migrate a VM using the number of vacancies belonging to each priority group and the priority rank of each priority group, assuming that the margin for the physical server 10 increases as the number of vacancies belonging to priority groups with higher priority ranks increases.

Margin Calculation Logic "3"

The margin is calculated using Equation 3 for VMs j arranged in each physical server 10.

$$\text{Margin } M=\Sigma_j a_j(N_j-C_j) \quad \text{(Equation 3)}$$

Here, $N_j$ indicates the priority rank of a priority group to which the VMj is desired to belong. $C_j$ indicates the priority rank of a priority group to which the VMj currently belongs. $a_j$ indicates a constant (a weight for each VM 1).

The physical server selector 30 can acquire information on the priority rank $N_j$ of the priority group to which the VMj is desired to belong and information on the priority rank $C_j$ of the priority group to which the VMj currently belongs by referring to VM state information (FIG. 5) which is stored in association with each physical server 10.

Use of the margin calculation logic "3" allows the controller 20 to easily determine a physical server 10 to which to migrate a VM using the priority rank of a priority group to which each VM 1 is desired to belong and the priority rank of a priority group to which each VM 1 currently belongs, assuming that the margin for the physical server 10 increases as the number of VMs 1 that are to shift to priority groups with lower priorities increases.

The physical server selector 30 calculates the margin using one of the three margin calculation logics. Then, the physical server selector 30 selects a physical server 10 having the largest margin as a physical server 10 to which to migrate a VM.

The physical server selector 30 generates migration instruction information including information on a VM 1 that the VM selector 29 has selected as a VM 1 to be migrated and information on the physical server 10 selected as a physical server 10 to which to migrate the VM and transmits the migration instruction information to a physical server 10 including the VM 1 indicated by the performance guarantee failure alarm information.

Process Flow

Figure 7:
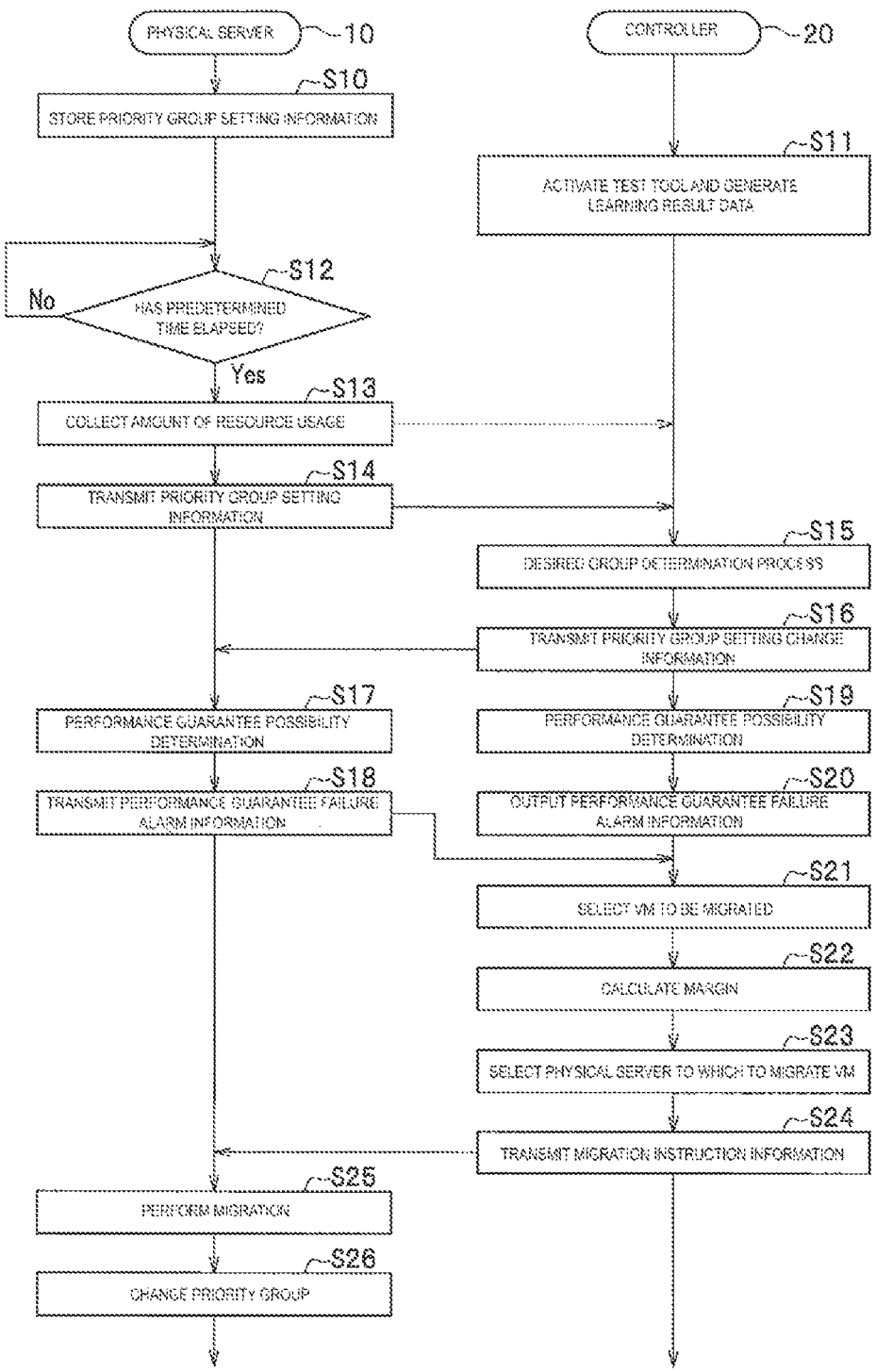
FIG. 7 is a flowchart illustrating a flow of a process performed by the VM migration system according to the present embodiment.

Next, a flow of a process performed by the VM migration system 100 will be described. FIG. 7 is a flowchart illustrating a flow of a process performed by the VM migration system 100 according to the present embodiment. FIG. 7 illustrates one of the plurality of physical servers 10 constituting the VM migration system 100 as a representative. The other physical servers 10 also perform the same process.

First, the priority group definer 12 of the physical server 10 stores information on the number of VMs sharing physical resources (CPU cores) corresponding to each priority group (the possible number of VMs belonging to each priority group: overcommit rate) and information indicating which priority group (which of the groups of priorities (priority ranks) [1] to [3]) each VM 1 belongs to in the storage unit as priority group setting information 14 (step S10).

Subsequently, the test tool functional unit 22 and the learning functional unit 23 of the controller 20 activate the test tool, acquire execution results of the test tool from the physical server 10, and generate learning result data necessary to calculate a performance value of each VM 1 (step S11). Using this learning result data, the performance value estimator 24 of the controller 20 can calculate the performance value based on data of the amount of resource usage of each VM 1 that is updated in real time.

Next, the resource usage amount collector 11 of the physical server 10 determines whether or not a predetermined time has elapsed (step S12). When the predetermined time has not elapsed (step S12 No), the process returns to step S12 and waits until the predetermined time elapses. On the other hand, when the predetermined time has elapsed (step S12 Yes), the process proceeds to the next step S13. That is, the subsequent processing is repeatedly performed at predetermined time intervals.

In step S13, the resource usage amount collector 11 of the physical server 10 collects information on the amount of resource usage of each VM 1 and transmits it to the controller 20. Further, in step S14, the priority group setting information transmitter 15 of the physical server 10 transmits the priority group setting information 14 in the storage unit to the controller 20 at predetermined time intervals. Specifically, the priority group setting information transmitter 15 transmits the number of VMs that share physical resources (CPU cores) of each priority group (the possible number of VMs belonging to each priority group) and information indicating which priority group (which of the groups of priorities [1] to [3]) each VM 1 belongs to, both of which are indicated by the priority group setting information 14, to the controller 20. Regardless of the order of the processing of steps S13 and S14, either the information on the amount of resource usage or the priority group setting information may first be transmitted to the controller 20 or both may be transmitted simultaneously.

Subsequently, the desired group determiner 27 of the controller 20 performs a desired group determination process for each VM 1 to determine a new priority group to which the VM is to belong (a priority group desired to belong to) so as not to cause insufficient performance or excessive performance based on the amount of resource usage and the priority group setting information 14 that the data acquirer 21 has acquired from the physical server 10 (step S15). Specifically, the desired group determiner 27 calculates the number of vacancies belonging to each priority group using the priority group setting information 14 as described above and generates priority group state information 210 (FIG. 2). Subsequently, the desired group determiner 27 performs a promotion group search or a demotion group search to determine a desired priority group for each VM 1 whose performance value calculated based on the amount of resource usage of the VM 1 belongs to an "insufficient performance range" or an "excessive performance range" and generates VM state information 220 (FIG. 5).

Then, the desired group determiner 27 transmits the new desired priority group of each VM 1 stored in the VM state information 220 to the physical server 10 as priority group setting change information (step S16).

Upon receiving the priority group setting change information from the controller 20, the performance guarantee determiner 16 determines whether or not a change of a priority group to which a VM 1 currently belongs to a new priority group to which the VM 1 is to belong included in the priority group setting change information is possible by referring to the priority group setting information 14 (step S17: performance guarantee possibility determination).

Then, when there is a vacancy in a priority group to which a change is to be made and thus the change is possible, the performance guarantee determiner 16 outputs information indicating this fact to the priority group changer 13 to cause the priority group changer 13 to change the priority group and updates the priority group setting information 14 and ends the processing. On the other hand, when there is no vacancy in a priority group to which a change is to be made and thus the change is not possible, the performance guarantee determiner 16 transmits performance guarantee failure alarm information to the controller 20 (step S18).

On the other hand, the performance guarantee possibility determiner 28 of the controller 20 determines whether or not performance guarantee defined by the SLA or the like can be realized based on predetermined logic (performance guarantee possibility determination logic) using information on the current priority group of the VM 1 (to which the VM 1 currently belongs) and the priority group to which the VM 1 is desired to belong determined by the desired group determiner 27 (step S19: performance guarantee possibility determination). Determination of this predetermined logic (performance guarantee possibility determination logic) is performed based on whether the conditions 1 and 2 described above are satisfied. Upon determining that the conditions 1 and 2 are not satisfied, the performance guarantee possibility determiner 28 outputs performance guarantee failure alarm information including the priority group to which the VM 1 whose performance guarantee is not possible belongs and identification information of the physical server 10 including the VM 1 to the VM selector 29 (step S20).

Next, upon acquiring the performance guarantee failure alarm information from either or both of the performance guarantee determiner 16 of the physical server 10 and the performance guarantee possibility determiner 28 of the controller 20, the VM selector 29 of the controller 20 selects a VM 1 to be migrated from VMs 1 currently belonging to the priority group to Which the VM 1 whose performance guarantee is not possible is desired to belong and in which there are no vacancies based on a predetermined rule (step S21). For example, the VM selector 29 selects a VM 1 having the smallest amount of memory usage from the VMs 1 belonging to the priority group in which there are no vacancies.

On the other hand, the physical server selector 30 of the controller 20 calculates the margin for each physical server 10, for example, based on predetermined logic that has been preset (any of the margin calculation logics "1" to "3") at predetermined time intervals (step S22) and stores the calculated margin in the physical server state information 230 (FIG. 6).

Then, triggered by the VM selector 29 selecting a VM 1 to be migrated, the physical server selector 30 selects a physical server 10 which has the largest margin among the margins for the physical servers 10 as a physical server 10 to which to migrate the VM (step S23).

Subsequently, the physical server selector 30 generates migration instruction information including information on the VM 1 that the VM selector 29 has selected as a VM 1 to be migrated and information on the physical server 10 selected as a physical server 10 to which to migrate the VM and transmits the migration instruction information to a physical server 10 including the VM 1 indicated by the performance guarantee failure alarm information (step S24).

Next, the VM migrator 17 of the physical server 10 receives the migration instruction information and migrates the VM 1 selected as a VM 1 to be migrated in cooperation with a VM migrator 17 of the selected physical server 10 (step S25). Then, the VM migrator 17 updates the priority group setting information 14 based on information on the migrated VM 1.

Subsequently, the priority group changer 13 of the physical server 10 changes the current priority group to a new priority group to which the VM 1 is to be belong, which is indicated by the priority group setting change information acquired from the controller 20, (step S26) and updates the priority group setting information 14 and ends the processing.

Even when there is no vacancy in a (candidate) priority group to which a VM is desired to belong, the VM migration system 100 and the VM migration method according to the present embodiment can enable change to the priority group to which the VM is desired to belong by selecting a physical server 10 having the largest margin as a physical server to which to migrate a VM 1 and then migrating the VM 1 as described above. This allows continuous realization of the performance guarantee of each VM 1.

It is to be noted that the present invention is not limited to the present embodiment described above and modifications can be made without departing from the spirit of the present invention.

For example, in the present embodiment, the physical server 10 includes the performance guarantee determiner 16 and the controller 20 also includes the performance guarantee possibility determiner 28 and the VM selector 29 of the controller 20 selects a VM 1 to be migrated upon acquiring performance guarantee failure alarm information from either or both of the performance guarantee determiner 16 and the performance guarantee possibility determiner 28 (step S21 in FIG. 7). However, only one of the physical server 10 and the controller 20 may include a function of determining whether or not performance guarantee is possible. This can achieve the same effects.

REFERENCE SIGNS LIST

1 VM (virtual router)
10 Physical server (compute)
11 Resource usage amount collector
12 Priority group definer
13 Priority group changer
14 Priority group setting information
15 Priority group setting information transmitter
16 Performance guarantee determiner
17 VM migrator
20 Controller
21 Data acquirer
22 Test tool functional unit
23 Learning functional unit
24 Performance value estimator
26 Data storage DB
27 Desired group determiner
28 Performance guarantee possibility determiner
29 VM selector
30 Physical server selector
100 VM migration system
210 Priority group state information
220 VM state information
230 Physical server state information

The invention claimed is:

1. A VM (virtual machine) migration system comprising a plurality of physical servers, each being configured to cause a plurality of VMs to run, and a controller connected to the plurality of physical servers and configured to manage running states of the VMs, wherein each of the plurality of physical servers includes a storage unit configured to store priority group setting information for a plurality of priority groups, the priority group setting information comprising, for each of the plurality of priority groups, (i) information on physical resources allocated to the respective priority group, (ii) information on VMs sharing the physical resources of the respective priority group, and (iii) a different number of VMs assignable to the respective priority group,
   wherein each of the plurality of the physical servers is configured to:
      collect an amount of resource usage for each VM running on a current priority group;
      transmit the collected amount of resource usage to the controller; and
      transmit the priority group setting information to the controller;
   wherein the controller is configured to:
      receive the amount of resource usage of each of the plurality of VMs and the priority group setting information from each of the plurality of physical servers;
      for each VM, calculate, for each respective priority group of the plurality of priority groups, a respective performance value based on the received amount of resource usage of the respective VM and the amount of physical resources allocated to the respective priority group;
      for each VM, determine a desired priority group by identifying a priority group having a calculated performance value that is (i) not below a first predetermined threshold indicating insufficient performance and (ii) not above a second predetermined threshold indicating excessive performance;
      determine whether a performance guarantee of each VM is possible, wherein the determination comprises:
         determining whether the current priority group meets the performance guarantee;
         in response to determining that the performance guarantee not being met by the current priority group, determining whether the desired priority group on the physical server the respective VM resides has room for the respective VM based on the priority group setting information; and
         outputting a performance guarantee failure alarm information in response to determining that the desired priority group has no room for the respective VM based on the priority group setting information; and in response to the outputted performance guarantee failure alarm information, perform the steps of:
calculating a margin for each physical server indicating how much an available processing capacity exists for the respective physical server,
selecting a physical server having a largest margin as another physical server to which the VM is to be migrated, and
generating and transmitting migration instruction information to the physical server that the VM currently runs on, wherein the migration instruction information identifies the VM to be migrated, the another physical server having the largest margin to which the VM is to be migrated to; and wherein the physical server where migration instruction information are transmitted to is configured to:
receive the migration instruction information from the controller and migrating the VM which is to be migrated to the physical server having the largest margin to which the VM is to be migrated to; and
based on the migration instruction information, modify the priority group setting information on the physical server.

2. The VM migration system according to claim 1, wherein the margin is calculated as:

$$M=S_k,$$

where $S_k$ indicates a number of VM vacancies in each physical server k.

3. The VM migration system according to claim 1, wherein the margin is calculated as:

$$M=\Sigma_i a_i E_i/P_i,$$

where $E_i$ indicates a number of vacancies belonging to a priority group i, $P_i$ indicates a priority rank of the priority group i, and $a_i$ indicates a constant (a weight of the priority group i).

4. The VM migration system according to claim 1, wherein the margin is calculated as:

$$M=\Sigma_j a_j(N_j-C_j),$$

where $N_j$ indicates a priority rank of a priority group to which a VMj is desired to belong to, $C_j$ indicates a priority rank of a priority group to which the VMj currently belongs to, and $a_i$ is a weight constant for VMj.

5. The VM migration system according to claim 1, wherein the controller does not determine whether a performance guarantee of each VM is possible, and
the physical server is configured to, upon receiving the priority group setting change information from the controller, transmit the performance guarantee failure alarm information to the controller if there is no vacancy belonging to a priority group to which a change has been instructed.

6. A method performed by a virtual machine (VM) migration system including a plurality of physical servers, each being configured to cause a plurality of VMs to run, and a controller, each of the plurality of physical servers includes a storage unit configured to store priority group setting information for a plurality of priority groups, the priority group setting information comprising, for each of the plurality of priority groups, (i) information on physical resources allocated to the respective priority group, (ii) information on VMs sharing the physical resources of the respective priority group, and (iii) a different number of VMs assignable to the respective priority group, the method comprising:

at each of the plurality of the physical servers:
collecting an amount of resource usage for each VM running on a current priority group, and transmitting the collected amount of resource usage to the controller; and
transmitting the priority group setting information to the controller;

a the controller:
receiving the amount of resource usage of each of the plurality of VMs and the priority group setting information from each of the plurality of physical servers;
for each VM, calculating, for each respective priority group of the plurality of priority groups, a respective performance value based on the received amount of resource usage of the respective VM and the amount of physical resources allocated to the respective priority group;
for each VM, determining a desired priority group based on identifying a priority group having a calculated performance value that is (i) not below a first predetermined threshold indicating insufficient performance and (ii) not above a second predetermined threshold indicating excessive performance;
determining whether a performance guarantee of each VM is possible, wherein the determination comprises:
determining whether the current priority group the performance guarantee;
in response to determining that the performance guarantee not being met by the current priority group, determining whether the desired priority group on the physical server the respective VM resides has room for the respective VM based on the priority group setting information; and
outputting a performance guarantee failure alarm information in response to determining that the desired priority group has no room for the respective VM based on the priority group setting information; and
in response to the outputted performance guarantee failure alarm information, performing the steps of:
calculating a margin for each physical server indicating how much an available processing capacity exist for the respective physical server,
selecting a physical server having a largest margin as another physical server to which the VM is to be migrated, and
generating and transmitting migration instruction information to the physical server that the VM currently runs on, wherein the migration instruction information identifies the VM to be migrated, the another physical server having the largest margin to which the VM is to be migrated to; and at the physical server where migration instruction information are transmitted to:
receiving the migration instruction information from the controller and migrating the VM which is to be migrated to the physical server having the largest margin to which the VM is to be migrated to; and based on the migration instruction information, modifying the priority group setting information on the physical server.

\* \* \* \* \*